United States Patent [19]

Moore

[11] 4,048,500

[45] Sept. 13, 1977

[54] INFRARED BACKGROUND SUPPRESSION

[75] Inventor: Kenneth L. Moore, China Lake, Calif.

[73] Assignee: The United States of America as represented by the Secretary of the Navy, Washington, D.C.

[21] Appl. No.: 739,916

[22] Filed: Nov. 8, 1976

[51] Int. Cl.² ............................................. G01N 23/00
[52] U.S. Cl. ................................... 250/350; 250/349; 250/351
[58] Field of Search ............... 250/338, 349, 350, 351, 250/345, 346

[56] References Cited

U.S. PATENT DOCUMENTS

| 3,144,554 | 8/1964 | Whitney | 250/350 |
| 3,529,152 | 9/1970 | Strange et al. | 250/346 X |
| 3,631,254 | 12/1971 | Covault | 250/350 X |

OTHER PUBLICATIONS

Technique for Background Elimination In Infrared Measurements; Moore, Rev. Sci., Instrum., vol. 46, No. 12, Dec. 1975, pp. 1667–1669.

Primary Examiner—Davis L. Willis
Attorney, Agent, or Firm—R. S. Sciascia; Roy Miller; W. Thom Skeer

[57] ABSTRACT

A system for eliminating background signals in chopped infrared measuring systems employs operational amplifier principles for subtracting a reference signal of proper amplitude, phase and frequency from the background-plus-signal radiation. The output is converted to a dc voltage level directly related to incident flux.

9 Claims, 3 Drawing Figures

INFRARED BACKGROUND SUPPRESSION

BACKGROUND OF THE INVENTION

1. Field of the Invention

This invention relates generally to infrared measurement techniques. In particular, this invention relates to the measurement of distant infrared sources in the far infrared region of the atmospheric window.

2. Description of the Prior Art

A wide variety of instruments are available in measuring infrared radiation in the confines of the laboratory. A smaller number of field instruments have been build and are commercially available which employ an infrared detector mounted in an evacuated DEWAR bottle equipped with a suitable window and having provisions for mounting spectral filters thereon. Such detector outputs are calibrated against the radiation emitted by a black body of a known temperature. When such a detector is calibrated and taken to a field location in a warm earth environment difficulties develop with the calibration technique. That is, distant sources produce very small signals at the detector and, when a chopper is used to help distinguish signal from background, the resulting waveform is a sine wave of which a considerable amount of noise is superimposed. In such environments the laboratory technique of using phase-lock processing circuitry and long integrating times to allow the accurate data is inconvenient and impractical. For field applications, a more compact and less costly technique required is for substracting dc signals from the background-thermal noise-signal.

SUMMARY OF THE INVENTION

The invention employs the generation of a reference signal having the same frequency as a signal received from the source under investigation, adjusting the phase and amplitude of these reference signals to correspond with the detected signal and summing the detected signal and reference to produce a zero level. Subsequent acquisition of point-source or distint-small-source infrared emmission will produce a signal free of the background noise except for broadband terminal noise which may be minimized by the use of an active filter tune to the chopper frequency.

DETAILED DESCRIPTION OF THE PREFERRED EMBODIMENT

Figure 1:
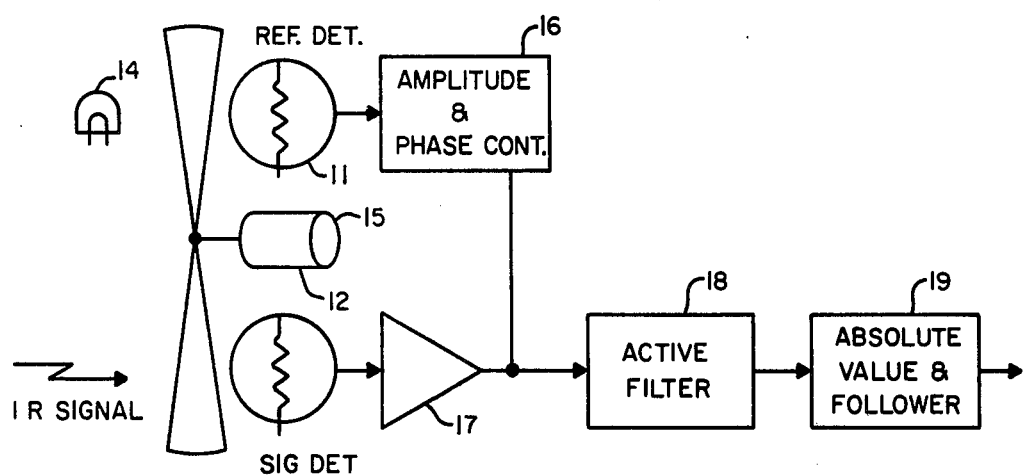
FIG. 1 is schematic representation of the invention.

Referring to FIG. 1, a reference detector 11 and a signal detector 12 are positioned to be occulated by a shutter 13. Shutter 13 interrupts the energy transfer between a light source 14 and a reference detector 11. Light source 14 may be a conventional ramp or, alternatively, any desired source of radiant energy to which reference detector 11 will respond. In developmental models, light source 14 is a conventional lamp and reference detector 12, a cadium sulphide photocell. Shutter 13 may preferable be an episcotister a disc having a cutout portion to pass radiant energy to detectors 11 and 12 driven by a motor 15.

The output from reference detector 11 is coupled to an amplitude and phase control circuit 16 which adjusts the amplitude of the alternating electrical energy analog of the interrupted emmissions from lamp 14 to a desired level and corrects the phase irregularities present on the signal to allow that a standard signal format. Because of the relative intensity of reference source 14 in comparison to the infrared signal, phase control circuit 16 generally attenuates the output on reference detector 11 although, of course, that is dependent upon the actual value obtained from the reference energy source 15.

Similarly, the infrared signal impinging signal detector 12 is chopped by shutter 13 which, as previously described, can be a conventional episcotistor. Thus, signal detector receive an interrupted infrared signal and converts it to an electrical analog much in the same fashion as reference detector 11.

As previously mentioned, signal detector 12 is a conventional far-infrared detector which is conventionally Dewar mounted. The output from signal detector 12 is amplified by means of preamplifier 17 to obtain the desired data signal level. The amplified output from amplifier 17 is connected so as to be summed with the output from phase control 16 to result in a difference signal which is applied to an active filter 18.

Active filter 18 is a conventional operational amplifier circuit which is tuned to pass over a narrow band of frequencies centered about the chopping frequency of shutter 15.

The output of active filter 18 is connected to absolute value detector and peak flower circuit 19 where the sine wave signal value is converted to a dc level.

Figure 2:
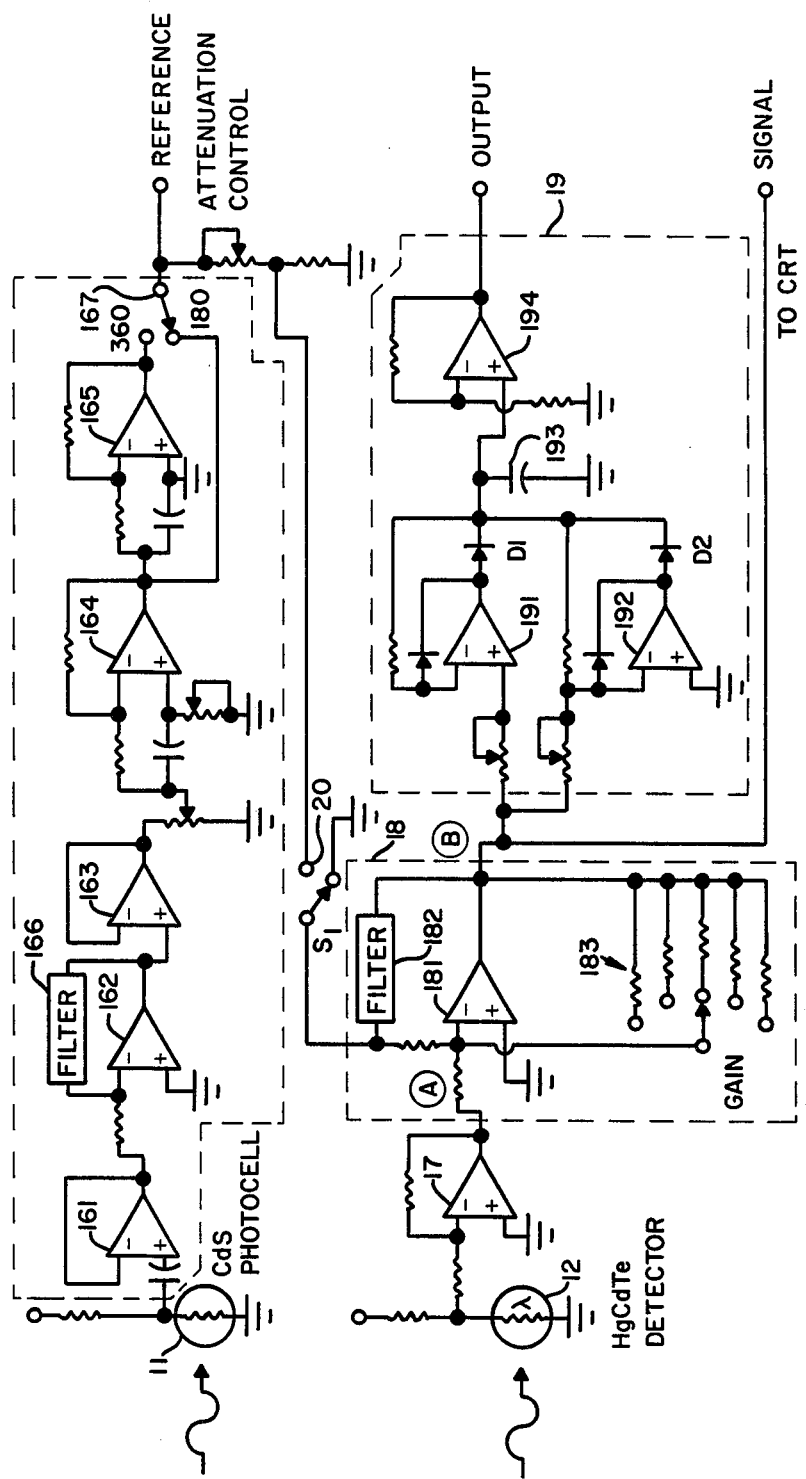
FIG. 2 is schematic diagram of the circuitry portion illustrated in FIG. 1.
Figure 3:
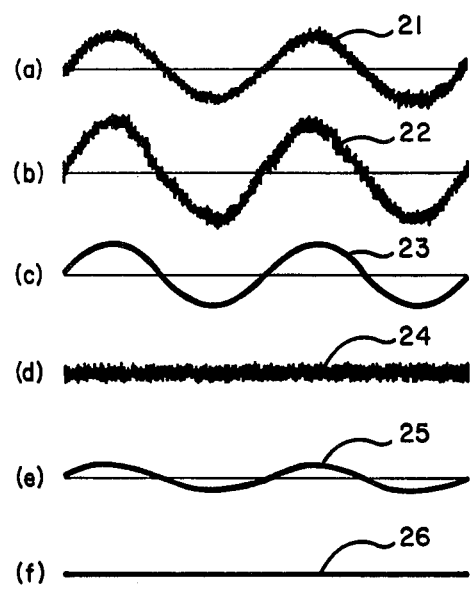
FIG. 3 is a waveform diagram showing representative signals taken at various points of the circuit illustrated in FIG. 2.

Referring to FIGS. 2 and 3, a more detailed description of the circuitry implementing the above described circuit and accompanying waveforms are illustrated. Amplitude and phasing circuit 16 is seen to comprise operational amplifiers 161-165. As shown, amplifier 162 is connected as a voltage follower with extremely high input impedance and chosen to provide an output which is free from nonlinear operation due to detector bias point shifts.

The output from operational amplifier 161 is connected to the input of operational amplifier 162 by means of the resistors network. Operational amplifier 162 provides a fixed gain and signal inversion and, due to a feedback network comprised of twin T filter 166 functions as an active filter which is tuned to a narrow bandpass centered about the chopper frequency. The output of operational amplifier 162 is connected to a voltage follower operational amplifier 163.

The output of voltage follower 163 is connected via a resistor gain control network to operational amplifier 164 which, like operational amplifier 165, is wire in a conventional fashion to function as a constant-amplitude phase shifter. The phase shift introduced by operational amplifier 164 is controlled by a resistor and capacitor network to shift the phase between zero and 180°. Operational amplifier 165 is wired with a resistor and capacitor feedback control such as to provide a constant 180° phase shift. The outputs of amplifiers 164 and 165 are selected by means of a switch 167 such that any degree of phase shift between zero and 360° may be achieved.

The impinging infrared radiation signal strikes infrared detector 12 and an electric analog is produced thereby which is resistively coupled to operational amplifier 17. Operational amplifier 17 is wired as a broadband inverter and has a signal processing gain of approximately 100. The output of preamplifier 17 is then resistively coupled to the amplitude emphasis filter 18 which, as shown, comprises a operational amplifier 181 which has a twin T filter feedback arrangement 182 similar to that previously discussed in connection with operational amplifier 162.

The resistive coupling network between preamplifier 17 and operational amplifier 181 also receives the input from switch 167 such that the resistive network functions as a signal combination means. Of course, a signal combination means might be devised to employ active elements, if desired.

Operational amplifier 181 also has in its feedback circuit a five position switch which selects among a plurality of resistors such that the gain of the amplifier may be effectively controlled. Since the switch selected resistive feedback network is in parallel with filter 182 the resistor can effectively reduce the amount of rejection provided that the filter network 182 such that a predetermined amount of signal supression may be obtained.

As will be further explained, it is useful to take a signal output at the point of the output of operational amplifier 181 for use in calibration. Operational amplifier 181 is resistively coupled to operational amplifier 181 and 182 which are connected as a conventional absolute value circuit such that the output of operational amplifier 181 is rectified and stored by capacitor 193. The value of compacitor 193 provides effecient storage such the the peak voltage is impressed thereon. The resistive values of the feedback network for operational amplifiers 191 and 192 are chosen such as to provide a unity gain. The output from operational amplifiers 191 and 192 is coupled to a unity gain follower which is comprised by a similar operational amplifier 194.

The operation of the system requires an initial balance of all the operational amplifiers. For this purpose individual balancing networks are provided however, for purposes of simplicity, they are not shown in the circuit diagram. With both the reference and the signal channels displayed on a dual trace oscilloscope, the amplitude and phase of the reference voltage are adjusted until the traces can be superimposed by moving one or the other vertically. Most portions of the calibration proceedure are performed with switch 20 in the illustrated position. Switch 20 is then placed in a position to connect the output of the reference channel into the resistive summing network to connect the unattenuated reference signal to the input of operational amplifier 181. Because of a signal inversions and phase and amplitude adjustments previously noted, the referencing background signals will cancel each other and a clean output will appear at point B, the output of operational amplifier 181. In the event that some sinusoidal features are still visable, they may be further "tuned out" by an adjustment of the reference amplitude and phase controls.

A secondary acquired signal such as generated by an object under study will appear on the oscilloscope as a clean sign wave and at the output terminal from operational amplifier 194 a dc level will appear which is directly related to the incident flux of the infrared signal. Typical results taken at point B, the output of operational amplifier 181, are indicated at FIG. 3.

Referring to FIG. 3, trace 21 indicates the background signal. Trace 22 indicates the background signal plus the source signal and trace 23 indicates the reference signal while trace 24 indicates the background signal and the reference signal. Trace 25 indicates the source signal filter as displayed as a CRT output. Trace 26, of course, indicates the dc level obtained at the output of operational amplitude 194.

The foregoing description taken together with the appended claims constitutes a disclosure such as to a person skilled in the electronic and infrared measuring art having the benefit of the teachings contained therein to make and use the invention. Further, the structure herein described generally constitutes a meritorious advance in the art and unobvious to these artisans not having the benefit of these teachings.

What is claimed is:

1. An infrared analyzer of the signal-and-reference type employing separate detectors for the reference and signal beam comprising:
   a single shutter positioned in the field of view of said detectors and driven to interupt the infrared energy reaching the detectors so as to cause the outputs thereof to vary alternatively at a predetermined frequency;
   signal combination means effectively connected to the detectors for subtractively combining the detector outputs and for limiting the output to the shutter predetermined frequency; and
   signal conversion means connected to said signal combination means for altering the signal to a D.C. analog of the signal intensity.

2. An infrared analyzer according to claim 1 in which said single shutter is a rotary mechanical episcotister.

3. An infrared signal according to claim 1 in which said signal combination means is connected to the reference beam detector by phase control circuit means.

4. An infrared signal analyzer according to claim 3 in which said phase control circuit includes:
   a variable phase shift circuit effectively connected to said detector for altering the phase of the output thereof a preselected mount;
   a second phase shift circuit connected to said variable phase shift circuit and being configured to introduce a fixed amount of phase shift in the signal passed thereby; and
   switch means connected to said variable phase shift circuit and to said second phase shift circuit for selectively connecting only said variable phase circuit or both said variable phase shift circuit and said second phase shift circuit in a signal processing path.

5. An infrared analyzer circuit according to claim 4 in which said phase control circuit includes signal antuation means.

6. An infrared analyzer according to claim 1 in which said signal combination means in connected to the signal detector by means of a gain controlled amplifier.

7. An infrared analyzer according to claim 1 in which said signal combination means includes an active filter tuned to the predetermined frequency determined by the signal shutter.

8. An infrared analyzer according to claim 1 in which said signal conversion means includes an absolute value and peak follower circuit.

9. A system for detecting low-energy infrared signals of in the presence of background noise signals comprising:
   signal receiving means for transmitting a beam of infrared energy including the low-energy infrared signals;

a source of reference infrared reference energy having similar spectral characteristics as the beam of infrared energy from said signal receiving means;

an optical-mechanical shutter positioned with respect to said source of reference infrared signals so as to interrupt the energy passage therefrom and thereby produce a pair of energy beams having identical cyclic variations of a predetermined processing frequency;

reference detector means positioned with respect to said optical-mechanical shutter to receive the cyclically varring infrared reference beam therefrom for producing electrical analogs therefrom;

first signal processing means corrected to said reference detector means for altering the phase and amplitude of said analog output therefrom to predetermined values;

signal detector means positioned with respect to said optical-mechanical shutter to intercept the cycally varying infrared signal beam therefrom for producing an electrical analog therefrom;

second signal processing means connected to said signal detector means for amplitude processing the electrical analog signal the same predetermined amplitude as said reference analog signal;

signal combining means connected to said first and second signal processing means for subtrative combination of the outputs thereof to eliminate identical components therefrom and produce an alternating signal analogous of only the differences in signal therebetween; and signal converting means connected to said single combining means for conversion of the difference output signal therefrom to a D.C. level analog of the infrared signal strength.

* * * * *